(12) United States Patent
Liu et al.

(10) Patent No.: US 11,763,433 B2
(45) Date of Patent: Sep. 19, 2023

(54) DEPTH IMAGE GENERATION METHOD AND DEVICE

(71) Applicant: SAMSUNG ELECTRONICS CO., LTD., Suwon-si (KR)

(72) Inventors: Zhihua Liu, Beijing (CN); Yamin Mao, Beijing (CN); Tianhao Gao, Beijing (CN); Hongseok Lee, Seoul (KR); Myungjae Jeon, Yongin-si (KR); Qiang Wang, Beijing (CN); Yuntae Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 401 days.

(21) Appl. No.: 17/094,932

(22) Filed: Nov. 11, 2020

(65) Prior Publication Data

US 2021/0150747 A1  May 20, 2021

(30) Foreign Application Priority Data

Nov. 14, 2019  (CN) .............................. 201911115722
Nov. 4, 2020  (KR) ........................ 10-2020-0146386

(51) Int. Cl.
  *G06T 5/50*  (2006.01)
  *G06T 7/00*  (2017.01)
  (Continued)

(52) U.S. Cl.
  CPC ................ *G06T 5/50* (2013.01); *G06F 18/22* (2023.01); *G06N 3/045* (2023.01); *G06N 3/084* (2013.01); *G06T 7/593* (2017.01); *G06T 7/97* (2017.01); *G06T 2207/10012* (2013.01); *G06T 2207/10028* (2013.01); *G06T 2207/20024* (2013.01); *G06T 2207/20081* (2013.01); *G06T 2207/20084* (2013.01); *G06T 2207/20221* (2013.01)

(58) Field of Classification Search
  CPC .. G06T 5/50; G06T 7/593; G06T 7/97; G06T 2207/10012; G06T 2207/10028; G06T 2207/20024; G06T 2207/20081; G06T 2207/20084; G06T 2207/20221; G06F 18/22; G06N 3/045; G06N 3/084
  See application file for complete search history.

(56) References Cited

U.S. PATENT DOCUMENTS 10,176,564 B1    1/2019  El Dokor et al.
10,455,219 B2 *  10/2019  Cohen .................. H04N 13/122
(Continued)

FOREIGN PATENT DOCUMENTS

CN    108986197 A    12/2018
EP    2887312 A1    6/2015

OTHER PUBLICATIONS

Hahne, U., et al., "Depth Imaging by Combining Time-of-Flight and On-Demand Stereo", In R. Koch and A. Kolb (Eds.): Dyn3D 2009, LNCS 5742, pp. 70-83, Springer, Heidelberg (2009).*
(Continued)

*Primary Examiner* — Xuemei G Chen
(74) *Attorney, Agent, or Firm* — Sughrue Mion, PLLC

(57) ABSTRACT

A depth image generation method includes obtaining a first depth image, based on a binocular image, obtaining a second depth image, using a depth camera, and obtaining a final depth image by performing image fusion on the obtained first depth image and the obtained second depth image.

19 Claims, 14 Drawing Sheets

(51) Int. Cl.
  *G06T 7/593* (2017.01)
  *G06N 3/084* (2023.01)
  *G06F 18/22* (2023.01)
  *G06N 3/045* (2023.01)

(56) References Cited

U.S. PATENT DOCUMENTS

| | | | | |
|---|---|---|---|---|
| 10,554,947 | B1* | 2/2020 | Li | H04N 13/128 |
| 10,965,929 | B1* | 3/2021 | Bellows | H04N 13/122 |
| 2009/0292468 | A1* | 11/2009 | Wu | G08G 1/165 |
| | | | | 342/146 |
| 2012/0113219 | A1* | 5/2012 | Chang | H04N 13/139 |
| | | | | 348/43 |
| 2014/0152776 | A1 | 6/2014 | Cohen et al. | |
| 2015/0310620 | A1 | 10/2015 | Aviv et al. | |
| 2016/0212411 | A1 | 7/2016 | Lindner et al. | |
| 2017/0169310 | A1* | 6/2017 | Chang | H04N 13/128 |
| 2017/0374352 | A1* | 12/2017 | Horesh | H04N 13/239 |
| 2018/0059679 | A1 | 3/2018 | Taimouri et al. | |
| 2018/0211401 | A1* | 7/2018 | Lee | G06T 7/593 |
| 2018/0275278 | A1* | 9/2018 | Yamada | G01C 3/085 |
| 2019/0132572 | A1* | 5/2019 | Shen | G01S 17/86 |
| 2019/0332942 | A1* | 10/2019 | Wang | G06N 3/045 |
| 2019/0333237 | A1* | 10/2019 | Javidnia | G06T 7/50 |
| 2020/0151289 | A1* | 5/2020 | Sikka | G06N 3/084 |
| 2020/0302629 | A1* | 9/2020 | Jie | G06N 3/048 |
| 2020/0327311 | A1* | 10/2020 | Xu | G06N 3/02 |
| 2020/0389642 | A1* | 12/2020 | Xu | H04N 13/271 |
| 2021/0042954 | A1* | 2/2021 | Guo | G06T 7/593 |
| 2021/0158534 | A1* | 5/2021 | Kakinuma | G06V 10/82 |
| 2021/0232847 | A1* | 7/2021 | Yue | G06F 18/213 |
| 2022/0058820 | A1* | 2/2022 | Rahnama | G06T 7/593 |

OTHER PUBLICATIONS

Gandhi, V., et al., "High-Resolution Depth Maps Based on TOF-Stereo Fusion", In: 2012 IEEE International Conference on Robotics and Automation (ICRA), pp. 4742-4749. IEEE (2012).*
Communication dated Apr. 12, 2021 issued by the European Patent Office in application No. 20207613.9.
Mutto, C., et al., "Locally Consistent ToF and Stereo Data Fusion", Advances In Cryptology—Crypto 2018, Part III, Oct. 7, 2012, XP047018854, pp. 598-607.
Szeliski, R., "Chapter 11.3 Dense correspondence: Computer Vision: Algorithms and Applications", Sep. 3, 2010, XP055790370, pp. 545-558 (23 pages).
Zhu, S., et al., "A Stereo Matching and Depth Map Acquisition Algorithm Based on Deep Learning and Improved Winner Takes All-Dynamic Programming", IEEE Access, vol. 7, 2019, XP011731197, pp. 74625-74639.
Knölbelreiter, P., et al., "End-to-End Training of Hybrid CNN-CRF Models for Stereo", 2017 IEEE Conference on Computer Vision and Pattern Recognition, Jul. 2017, XP033249485, pp. 1456-1465.
Žbontar, J., et al., "Computing the Stereo Matching Cost with a Convolutional Neural Network", 2015 IEEE Conference on Computer Vision and Pattern Recognition, Jun. 2015, XP032793569, pp. 1592-1599.
Jie, Z., et al., "Left-Right Comparative Recurrent Model for Stereo Matching", 2018 IEEE/CVF Conference on Computer Vision and Pattern Recognition, Jun. 18, 2018, XP033476355, pp. 3838-3846.
Yan et al., "DDRNet: Depth Map Denoising and Refinement for Consumer Depth Cameras Using Cascaded CNNs," Computer Vision Foundation, ECCV 2018, pp. 1-17; Computer Vision Foundation.
Poggi et al., "Guided Stereo Matching," arXiv:1905.10107v1 [cs.CV], May 24, 2019, Total 10 pages.

* cited by examiner

DEPTH IMAGE GENERATION METHOD AND DEVICE

CROSS-REFERENCE TO RELATED APPLICATION

This application is based on and claims priority under 35 U.S.C. § 119 to Chinese Patent Application No. 201911115722.0, filed on Nov. 14, 2019, in the Chinese Intellectual Property Office, and to Korean Patent Application No. 10-2020-0146386, filed on Nov. 4, 2020, in the Korean Intellectual Property Office, the disclosure of which are incorporated by reference herein in their entireties.

BACKGROUND

Field

The disclosure relates to the field of image processing, and more particularly, to a depth image generation method and device.

Description of Related Arts

Recently, in many technologies such as autonomous driving, robot navigation, augmented reality, or the like, high-level tasks are solved based on accurate and dense depth estimation. Depth may be obtained by sensors such as radars (LiDAR), structured light (SL) sensors, time-of-flight (TOF) sensors, or the like, and may also be generated from a binocular image through depth estimation based on a stereo matching algorithm.

In detail, LiDAR is a sensor that may accurately measure long distances, but may only provide sparse depth images and have a small imaging field of view in a vertical direction. In addition, a high-accuracy LiDAR device is expensive and bulky, which limits the application scenarios thereof. The measurement distances of the SL and TOF sensors are limited and the accuracy thereof gradually decreases as the measurement distance increases. Such a shortcoming limits the measurement ranges thereof, and the sensors are not effective in outdoor environments, and depth images collected have problems of high noise and low resolution. The depth estimation based on the stereo matching algorithm may obtain dense depth images and the method based on a deep learning network has the highest accuracy currently. However, when encountering so-called 'µl-conditioned' areas such as untextured areas, reflective areas, occlusion areas, or the like, the accuracy of the depth estimation decreases and a problem of domain adaptation exists. That is, a network model trained on a particular data set (for example, a synthetic data set) has a problem of reduced accuracy when being switched to another data set (for example, a real data set), which is not suitable to be applied in a new environment.

SUMMARY

According to example embodiments, a depth image generation method includes obtaining a first depth image, based on a binocular image, obtaining a second depth image, using a depth camera, and obtaining a final depth image by performing image fusion on the obtained first depth image and the obtained second depth image.

The obtaining the second depth image may include extracting a depth feature from a third depth image that is obtained using the depth camera, and obtaining the second depth image, on which depth completion is performed, by performing, on the extracted depth feature, filtering that is guided by a similarity matrix. The similarity matrix may be obtained based on the binocular image.

The generating of the second depth image, on which the depth completion is performed, may include obtaining a similarity degree between a current pixel of a depth image and a neighboring pixel of the current pixel, based on the similarity matrix, and performing filtering on a depth feature of the current pixel according to a predetermined direction, based on a depth feature of the neighboring pixel and the obtained similarity degree.

The predetermined direction may include any one or any combination of a direction from top to bottom, a direction from bottom to top, a direction from left to right, and a direction from right to left.

The obtaining of the first depth image may include obtaining a first feature image of each monocular image included in the binocular image, obtaining a matching cost matrix, based on the obtained first feature image of each monocular image, performing cost aggregation on the obtained matching cost matrix, and obtaining a depth image of each monocular image, based on the matching cost matrix on which the cost aggregation is performed.

The obtaining of the first depth image may further include obtaining a reliable depth image of each monocular image by performing consistency detection on the obtained depth image of each monocular image.

The obtaining of the first feature image may include performing feature extraction on the binocular image, based on a neural network of an attention mechanism.

The obtaining of the matching cost matrix may include obtaining an initial matching cost matrix, based on the obtained first feature image of each monocular image, and obtaining the matching cost matrix by performing convolution on the obtained initial matching cost matrix, using a predetermined neural network.

The performing of the cost aggregation may include performing the cost aggregation on the obtained matching cost matrix, using a graph neural network (GNN).

The performing of the cost aggregation may include obtaining a neighboring node of each central node that is an element of the obtained matching cost matrix, based on a distance, and obtaining a matching cost matrix of a first generation of cost aggregation by updating a matching cost of each central node, based on a weight of the obtained neighboring node of each central node and a matching cost of the obtained neighboring node of each central node.

The performing of the cost aggregation may further include performing the cost aggregation on the obtained matching cost matrix, using a second feature image to guide the cost aggregation.

The second feature image may be generated based on a semantic segmentation neural network, or is the same as the first feature image.

The performing of the cost aggregation may further include obtaining a neighboring node of each pixel of the second feature image, based on the distance, obtaining the neighboring node of each central node that is the element of the obtained matching cost matrix, based on a pixel correspondence relationship between the second feature image and a matching cost, obtaining a matching cost matrix of a second generation of cost aggregation by updating the matching cost of each central node, based on a weight and a matching cost of neighboring nodes, and obtaining a matching cost matrix of a third generation of cost aggregation by aggregating the obtained matching cost matrix of the first generation of cost aggregation and the obtained matching cost matrix of the second generation of cost aggregation.

The distance may be one among a spatial distance, a feature vector distance, and a weighted sum of the spatial distance and the feature vector distance.

The performing of the cost aggregation may include obtaining a temporary matching cost matrix, based on multiple matching cost matrices of different scales, obtaining a probability that each element of the temporary matching cost matrix corresponds to a predetermined parallax, and obtaining a matching cost matrix of a fourth generation of cost aggregation, based on the obtained probability and the obtained temporary matching cost matrix.

The performing of the cost aggregation may include obtaining a matching cost matrix of a fifth generation, based on a similarity matrix and the obtained matching cost matrix. The similarity matrix may be generated based on the binocular image.

The obtaining of the first depth image may include obtaining a first feature image of each monocular image included in the binocular image by performing feature extraction on the binocular image, using a predetermined neural network, obtaining a matching cost matrix, based on the obtained first feature image of each monocular image, calculating a probability that each element of the obtained matching cost matrix corresponds to a predetermined parallax, to convert the obtained matching cost matrix into a matching probability matrix, and obtaining a depth image of each monocular image, based on the obtained matching probability matrix.

A non-transitory computer-readable storage medium stores instructions that, when executed by at least one processor, cause the at least one processor to perform the depth image generation image.

According to example embodiments, a depth image generation device includes a memory storing instructions, and at least one processor configured to execute the stored instructions to obtain a first depth image, based on a binocular image, obtain a second depth image, using a depth camera, and obtain a final depth image by performing image fusion on the obtained first depth image and the obtained second depth image.

The at least one processor may be further configured to executed the stored instructions to extract a depth feature from a third depth image that is obtained using the depth camera, and obtain the second depth image, on which depth completion is performed, by performing, on the extracted depth feature, filtering that is guided by a similarity matrix. The similarity matrix may be obtained based on the binocular image.

According to example embodiments, a depth image generation method includes selecting a monocular image from a binocular image, obtaining a similarity degree between image pixels of the selected monocular image, using a first neural network, to obtain a similarity matrix, performing feature extraction on a depth image that is obtained using a depth camera, using a second neural network, to obtain a depth feature, performing filtering on the obtained depth feature, based on the obtained similarity matrix, to obtain a second depth image, and obtaining a final depth image by performing image fusion on the obtained first depth image and the obtained second depth image.

Additional aspects will be set forth in part in the description that follows and, in part, will be apparent from the description, or may be learned by practice of the presented example embodiments.

BRIEF DESCRIPTION OF THE DRAWINGS

The above and other aspects, features, and advantages of example embodiments of the disclosure will be more apparent from the following description taken in conjunction with the accompanying drawings, in which.

DETAILED DESCRIPTION

The disclosure obtains a high-quality depth image by simultaneously optimizing a depth image obtained by a sensor and a depth image obtained by a stereo matching algorithm. On the one hand, in view of problems of noise, sparseness, and low resolution of depth images obtained from the sensor, a deep learning network guided based on binocular images is proposed to complete the depth image obtained by the sensor to obtain the completed depth image A (a second depth image in example); on the other hand, in view of a problem of poor accuracy of depth estimation based on deep learning methods in so-called 'µl-conditioned' areas, a deep learning network based on an attention mechanism and graph neural network is proposed to extract robust features and transfer the robust features to the ill-conditioned areas to obtain a depth image B (a first depth image in example); and finally, the completed depth image A and the depth image B obtained by the stereo matching algorithm are jointly optimized through the depth optimization, corresponding normal vector maps are respectively obtained from the depth images A and B, and a high-quality depth image (a final depth image in example) is generated through consistency constraints of the normal vector maps.

Figure 1:
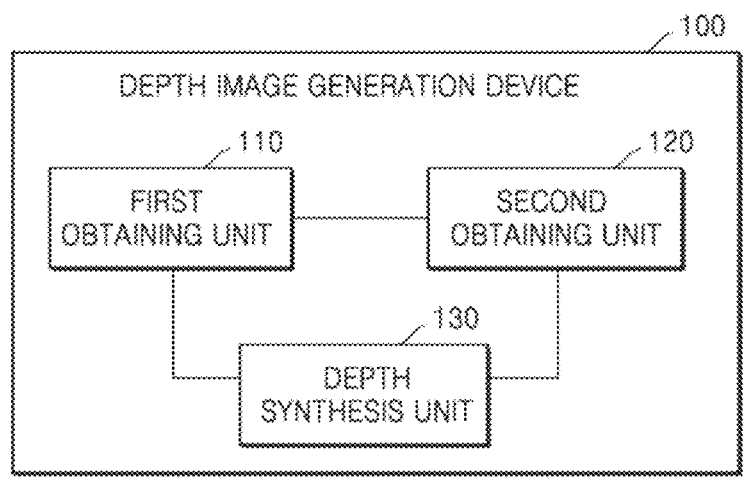
FIG. 1 is a block diagram illustrating a depth image generation device according to an example embodiment of the disclosure.

FIG. 1 is a block diagram illustrating a depth image generation device 100 according to an example embodiment of the disclosure.

Referring to FIG. 1, the depth image generation device 100 according to an example embodiment of the disclosure may include a first obtaining unit 110, a second obtaining unit 120, and a depth synthesis unit 130.

The first obtaining unit 110 may generate a first depth image based on a binocular image. In addition, the first obtaining unit 110 may also generate a similarity matrix based on the binocular image. Herein, the first obtaining unit 110 may arbitrarily select a monocular image from the binocular image (only as an example and not a limitation, a left image or a right image) and use a neural network (only as an example and not a limitation, the neural network may be a convolutional neural network (CNN)) to calculate a similarity degree between image pixels, thereby obtaining the similarity matrix. In addition, only as an example and not a limitation, the binocular image may be collected by a binocular camera. Furthermore, it may be understood that a left image, right image, left parallax image, right parallax image, left depth image, right depth image, or the like described in the disclosure are only examples of a binocular image, but not limited thereto. The disclosure is also applicable to other types of binocular images, such as top and bottom type binocular images.

The second obtaining unit 120 may obtain a second depth image collected by a depth camera. In detail, the second obtaining unit 120 may generate a second depth image by performing depth completion on a depth image based on the similarity matrix. In detail, the second obtaining unit 120 may first obtain the similarity matrix generated by the first obtaining unit 110, and then input a depth image to a deep learning network configured by the second obtaining unit 120 to obtain a second depth image. In addition, a depth image may also be directly input to output a second depth image in using an existing deep learning network. However, the disclosure obtains a similarity degree between pixels of depth images through a similarity matrix, such that a network may be guided to give neighboring pixels with a high degree of similarity a higher weight during depth completion, thereby obtaining a completed depth image with higher accuracy. Herein, only as an example and not a limitation, the depth images may be collected by a depth camera such as a structured light (SL) or time-of-flight (TOF) sensor.

The depth synthesis unit 130 may generate a final depth image by performing image fusion on the first depth image and the second depth image. Herein, only as an example and not a limitation, the depth synthesis unit 130 may perform the image fusion by using, for example, a weighted fusion method, to output a high-quality depth image.

Hereinafter, the depth image generation device 100 according to an example embodiment of the disclosure will be described in more detail with reference to FIGS. 2 and 3.

Figure 2:
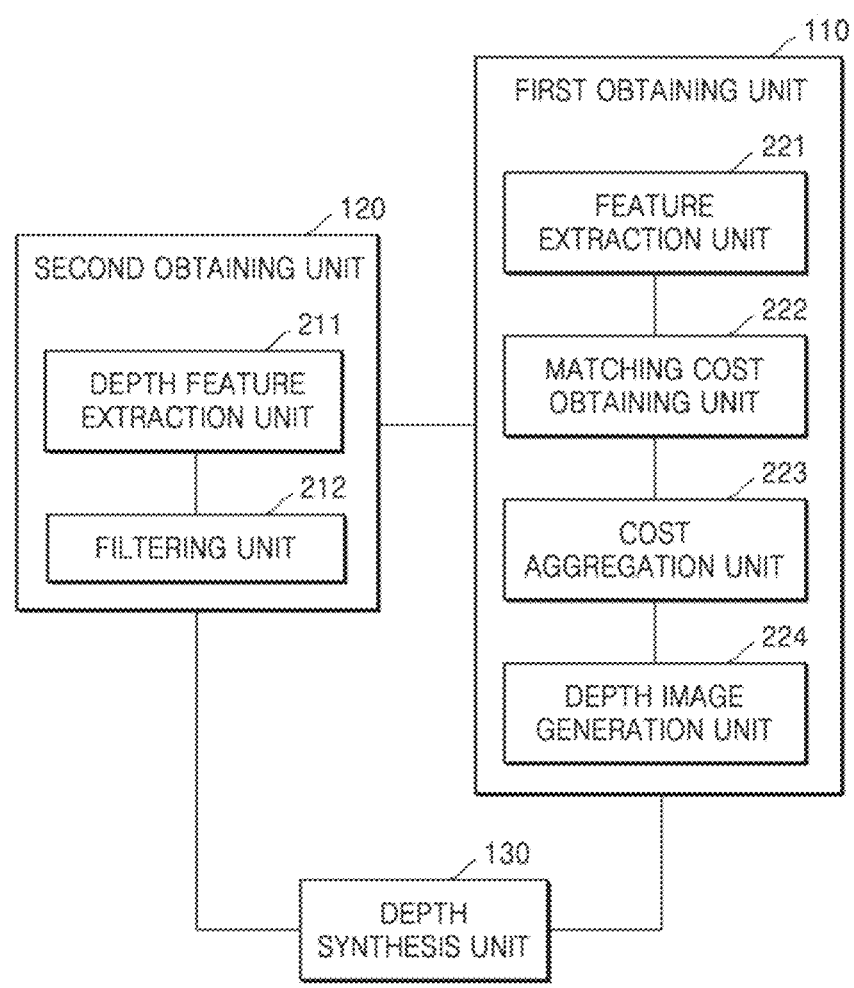
FIG. 2 is a detailed block diagram of a depth image generation device according to an example embodiment of the disclosure.
Figure 3:
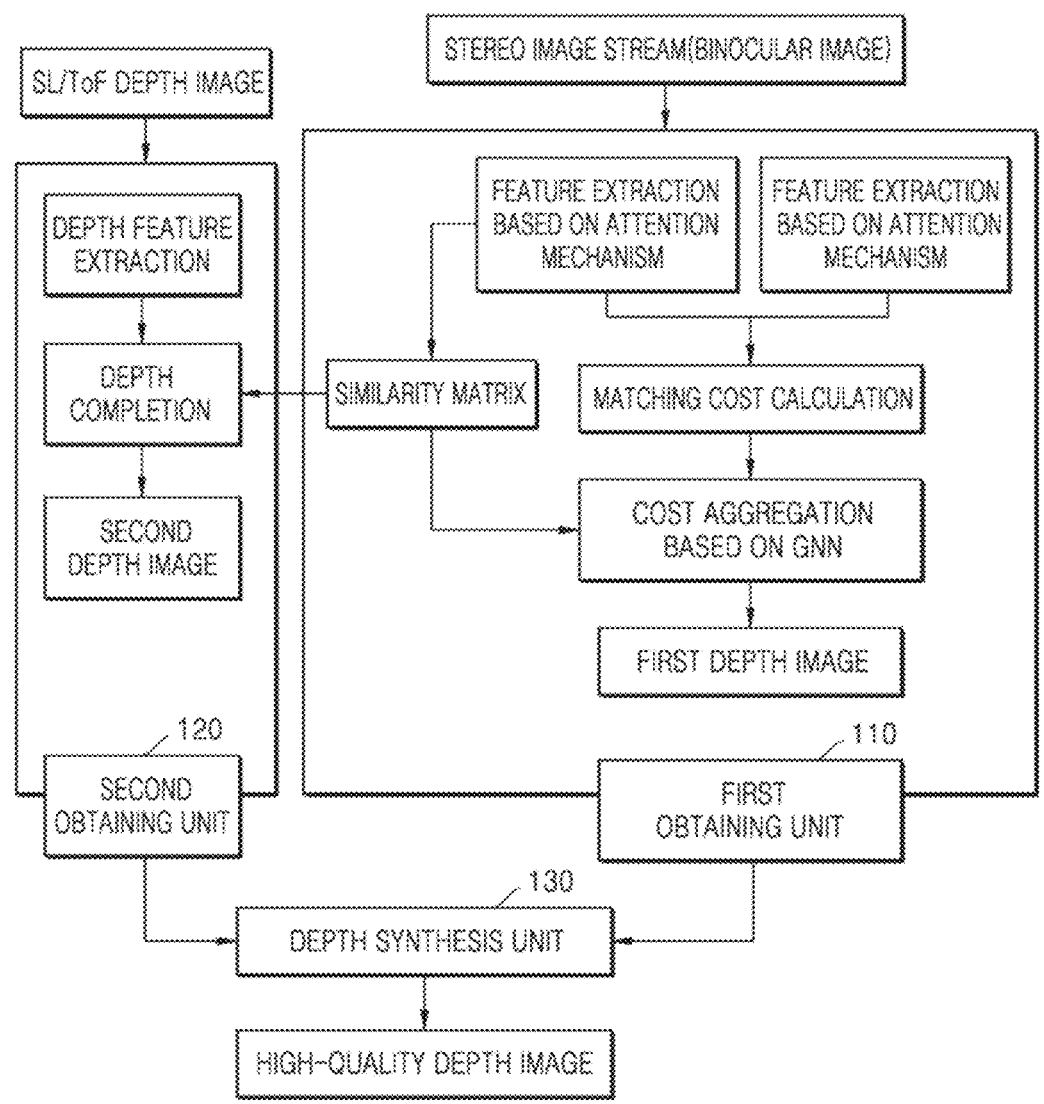
FIG. 3 is a diagram of a depth image generation device according to an example embodiment of the disclosure.

FIG. 2 is a detailed block diagram of the depth image generation device 100 according to an example embodiment of the disclosure. FIG. 3 is a diagram of the depth image generation device 100 according to an example embodiment of the disclosure.

Referring to FIG. 2, the second obtaining unit 120 may include a depth feature extraction unit 211 and a filtering unit 212, and the first obtaining unit 110 may include a feature extraction unit 221, a matching cost obtaining unit 222, a cost aggregation unit 223, and a depth image generation unit 224.

The depth feature extraction unit 211 may extract a depth feature from a third depth image, e.g., an SL/ToF depth image. In detail, the depth feature extraction unit 211 may input a depth image to a neural network (only as an example and not a limitation, the neural network may be a CNN) to extract a depth feature.

Subsequently, the third depth image is filtered to fill-in holes of the third depth image and improve the resolution of the third depth image. In the disclosure, filtering is guided based on the similarity matrix, which not only maintains boundary information but also ensures the smoothness inside an object.

Figure 4:
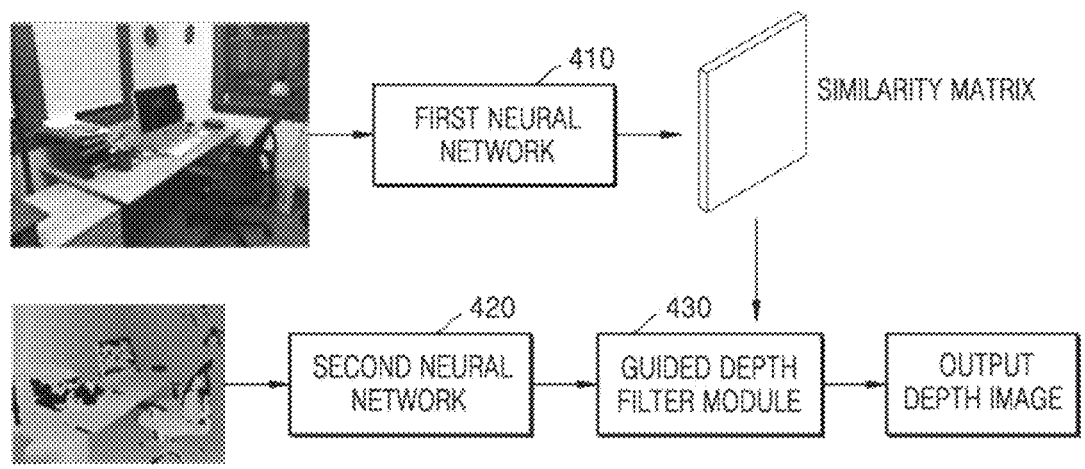
FIG. 4 is a diagram illustrating depth filtering guided by an obtained similarity matrix, according to an example embodiment of the disclosure.

FIG. 4 is a diagram illustrating depth filtering guided by an obtained similarity matrix, according to an example embodiment of the disclosure. As shown in FIG. 4, the first obtaining unit 110 may generate a similarity matrix based on a binocular image and use the same for filtering of the second obtaining unit 120. Herein, the filtering unit 212 may generate the second depth image, in which depth completion is performed, by performing filtering guided by the similarity matrix on the extracted depth feature. Herein, the depth synthesis unit 130 may generate a final depth image by performing image fusion on the first depth image and the second depth image.

As shown in FIG. 4, a first neural network 410 may be an encoder/decoder network that may be included in the first obtaining unit 110 to generate a similarity matrix. A second neural network 420 may be an encoder/decoder network for encoding/decoding the image collected by the second obtaining unit 120. An output depth image of FIG. 4 may be a second depth image.

The role of the similarity matrix may be to calculate pixel similarity to guide adaptive aggregation of the following features, which is more conducive to propagation in areas with less texture. In detail, the filtering unit 212 or a guided depth filter module 430 may obtain a similarity degree between a current pixel of a depth image and a neighboring pixel of the current pixel based on the similarity matrix, and perform filtering on a depth feature of the current pixel according to a predetermined direction based on a depth feature of the neighboring pixel and the similarity degree.

Only as an example and not a limitation, a depth feature of a current pixel of an obtained depth image is assumed as F (the dimension is H*W*C, where H represents the height, W represents the width, and C represents a number of channels), and the filtering unit 212 may slice the depth feature along the dimension to obtain C depth feature slices (the dimension is H*W), wherein a process of conduction within each depth feature slice includes updates in a predetermined direction. Herein, only as an example and not a limitation, the predetermined direction may include any one or any combination of a direction from top to bottom, a direction from bottom to top, a direction from left to right, and a direction from right to left. In addition, only as an example and not a limitation, for the direction from top to bottom and the direction from left to right, a depth feature value of a neighboring pixel q of a current pixel p is assumed as d'(q), and the filtering unit 212 may obtain a similarity degree w between the current pixel p and the neighboring pixel q through a similarity matrix, and perform filtering on a depth feature value d(p) of the current pixel p according to the following Equation (1) to obtain an updated depth feature value d'(p) of the current pixel p; for the direction from bottom to top and the direction from right to left, a depth feature value of the neighboring pixel q of the current pixel p before the update is assumed as d(q) and the depth feature value after the update is d'(q), and the filtering unit 212 may obtain the similarity degree w between the current pixel p and the neighboring pixel q through the similarity matrix, and perform filtering on the depth feature value d(p) of the current pixel p according to the following Equation (2) to obtain an updated depth feature value d"(p) of the current pixel p. The filtering unit 212 may then perform convolution on the filtered depth feature through a neural network such as a CNN to generate a depth-completed second depth image.

$$d'(p)=d(p)+w*d'(q) \quad (1)$$

$$d''(p)=w*d(q)+(1-w^2)*d'(q) \quad (2)$$

By using a multi-view geometry theory, a depth of a pixel may be calculated through a parallax of two monocular images (only as an example and not a limitation, a left image and a right image) of a binocular image. Herein, a parallax image may be generated through a stereo matching algorithm, that is, a correspondence relationship between pixels of the left image and the right image is found and a matching cost is minimized to generate the parallax image. Currently, with the application of deep learning networks in the stereo matching algorithm, the accuracy of parallax images has been greatly improved, but in ill-conditioned areas such as untextured areas, occlusion areas, reflective areas, or the like, errors in generated parallax images are still large. To solve the above-stated challenging problem, the disclosure improves three operations in the stereo matching algorithm, namely, matching cost calculation, cost aggregation, and parallax calculation. In the matching cost calculation, an attention mechanism may be used to perform feature extraction to obtain robust depth features (such as object boundaries, or the like) to reduce mismatches between binocular image pixels, such that cost matching in ill-conditioned areas may be more accurate. In addition, a reliable depth may be determined through the learned left and right depth images and fed back to feature extraction networks to increase feature/matching cost, which will be described later. In the cost aggregation, a graph neural network may be used to perform cost aggregation to capture a longer range of dependencies between pixels, and the extracted robust features may be transferred to the ill-conditioned areas. In the parallax calculation, left and right consistency constraints may be used for pixels without label information.

The feature extraction unit 221 may obtain a first feature image of each monocular image included in a binocular image. In detail, the feature extraction unit 221 may perform feature extraction on the binocular image based on a neural network of an attention mechanism. In addition, a similarity matrix may be obtained by the feature extraction unit 221 based on the binocular image, and may be obtained by another unit arranged in the first obtaining unit 110.

Figure 5:
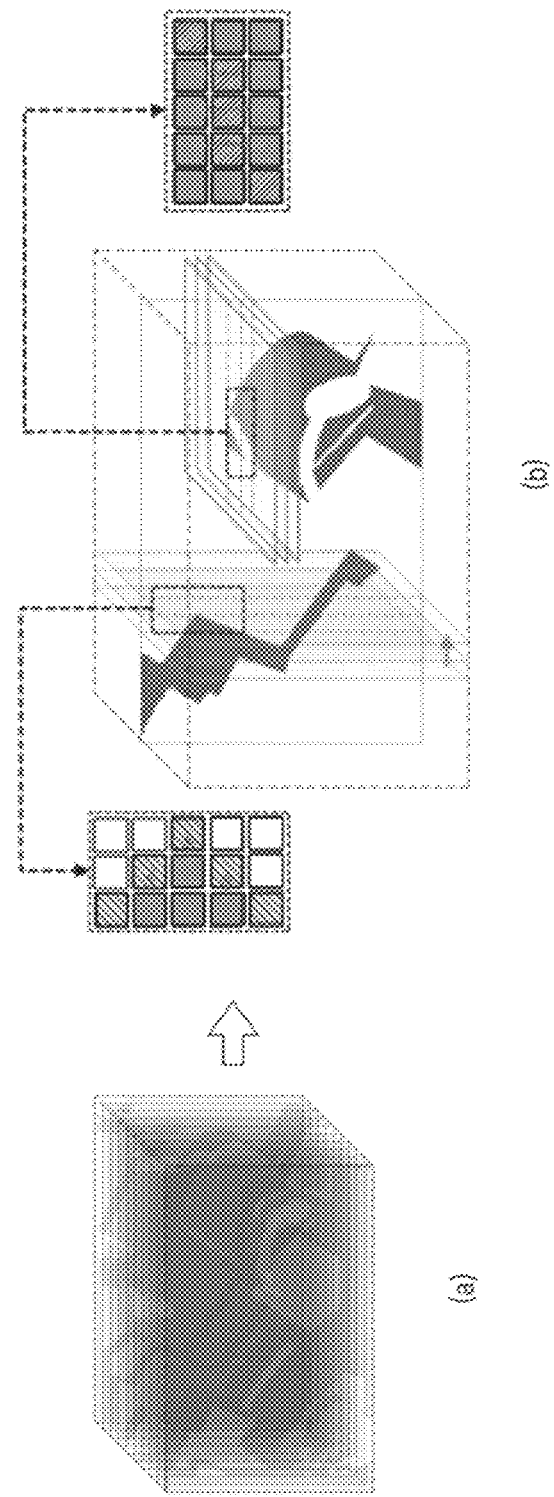
FIG. 5 is a diagram illustrating feature extraction based on an attention mechanism, according to an example embodiment of the disclosure.

FIG. 5 is a diagram illustrating feature extraction based on an attention mechanism, according to an example embodiment of the disclosure. Before adding the attention mechanism, feature aggregation is performed between features by a convolution operation, and the size of a receptive field is determined by the size of a convolution kernel, while after adding the attention mechanism, different weights are given to different features so a range of feature aggregation is dynamic.

As shown in FIG. 5, a left portion (a) indicates a feature image and a right portion (b) indicates an attention mechanism. A weight corresponding to features is learned through the attention mechanism. When the weight of features used in a convolution operation of a neural network based on the attention mechanism is small, as indicated by an arrow to the left in the right portion (b) of FIG. 5, an amount of information that the feature propagates to a central feature of the convolution operation is blocked, and as indicated by an arrow to the right in the right portion (b), the propagation refers to an amount of information that surrounding features contribute to the central feature in the convolution operation. When the attention mechanism captures object boundary information, features belonging to the same object may be aggregated, and features not belonging to the same object may be blocked.

In detail, the feature extraction unit 221 may first perform feature extraction on a binocular image to obtain a feature image F (the dimension is H*W*C, wherein H represents the height of the feature image F, W represents the width of the feature image F, and C represents the number of channels of the feature image F) of each monocular image included in the binocular image, take a feature image $f_i$ (the dimension is H*W) of each channel, and perform a maximum pooling operation MaxPool($f_i$) on the feature image $f_i$. That is, a largest element $m_i$ in the feature image $f_i$ is calculated, a total of C channels is calculated, therefore, the maximum pooling operation is performed C times, and finally C largest elements $m_1, m_2, \ldots, m_c$ are obtained. Then, $m_1, m_2, \ldots, m_c$ are input to a neural network to obtain attention parameters $a_1, a_2, \ldots, a_c$. Finally, the attention parameters $a_1, a_2, \ldots, a_c$ are respectively multiplied element-by-element with feature images $f_1, f_2, \ldots, f_c$ of different channels to obtain a new feature image F'.

As another example, the feature extraction may also be based on the attention mechanism of a feature space. That is, the feature extraction unit 221 may take the feature image $f_j$ (the dimension: C) of each pixel of the feature image F and perform a maximum pooling operation MaxPool($f_j$) on the feature image $f_j$. That is, the largest element $m_j$ in the feature image $f_j$ is calculated, a total of H*W pixels is calculated, therefore, the maximum pooling operation is performed H*W times, and finally, H*W largest elements $m_1, m_2, \ldots, m_{H*W}$ are obtained. Then, $m_1, m_2, \ldots m_{H*W}$ are input to the neural network to obtain attention parameters $b_1, b_2, b_{H*W}$. Finally, the attention parameters $b_1, b_2, b_{H*W}$ are respectively multiplied element-by-element with feature images $f_1, f_2, f_{H*W}$ of different elements to obtain a new feature image F." Therefore, the attention mechanism may be applied to the feature extraction of the left and right images, and attention is used to learn global information to obtain robust depth features (object boundaries or the like), thereby reducing mismatches between binocular image pixels, and allowing a matching cost in an ill-conditioned area to be more accurate.

Robust and reliable stereo matching is important for scene understanding in multimedia applications. Strong visual cues may be well detected and matched with current feature descriptors, but usually strong visual cues are too sparse to propagate a cost of matching. However, propagating a cost from strong cells to weak cells is the key to generate dense parallax images. In view of this, a propagation module based on an attention mechanism may be designed to propagate a reliable matching cost from a unit to a neighboring area thereof, especially an ill-conditioned area. The propagation module based on the attention mechanism may include two portions, namely, an attention portion and a propagation portion.

In detail, robust matching belief may be enhanced and false-positive matching belief may be weakened by embedding a spatial attention layer on a stacked hourglass module of an existing convolution neural network model. After compressing a four-dimensional matching cost to be three-dimensional, the three-dimensional matching cost may be cut into pieces, and parallax belief propagation may be performed from side to side for each piece. Unlike the structure of the stacked hourglass module, explicit parallax belief propagation may be used in the matching cost to obtain more effective belief propagation.

Figure 6:
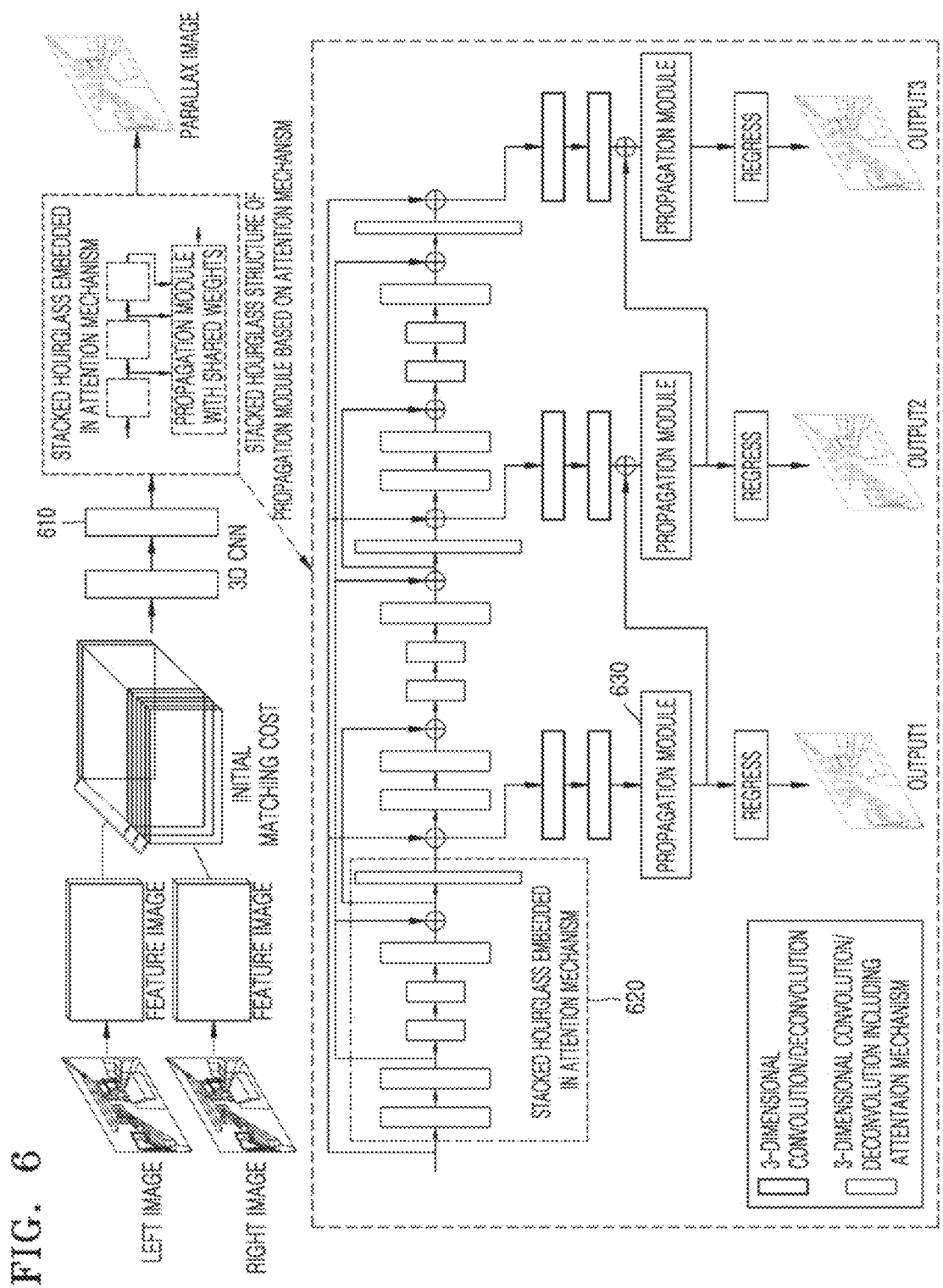
FIG. 6 is a diagram of a stacked hourglass structure of a propagation module based on an attention mechanism, according to an example embodiment of the disclosure.

FIG. 6 is a diagram of a stacked hourglass structure 620 of a propagation module 630 based on an attention mechanism, according to an example embodiment of the disclosure. As shown in FIG. 6, an existing CNN model 610 may be used as a main frame, and the stacked hourglass structure 620 of a stacked hourglass module may be improved by the propagation module 630 based on the attention mechanism. Because information transmission of each unit to a neighboring area thereof is similar to a shared convolutional kernel, a spatial attention mechanism may be introduced to expand the influence of strong robust pixels, and at the same time, a channel attention mechanism may be introduced to extract robust features more efficiently. The propagation module 630 in FIG. 6 is based on the attention mechanism according to an example embodiment of the disclosure, wherein the stacked hourglass structure 620 of the propagation module 630 based on the attention mechanism has the same meaning as the stacked hourglass embedded in the attention mechanism.

A stacked hourglass module structure of a CNN model may transfer information from a unit to a neighboring unit through different scale designs, and may expand a range of each unit by upsampling and downsampling a matching cost. However, effects of such information exchange are sometimes insufficient, because the influence of one pixel on another pixel is closely related to the distance between the pixels.

Figure 7:
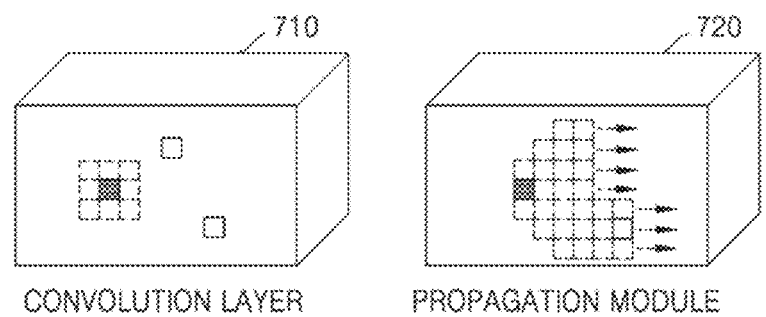
FIG. 7 is a diagram illustrating an influence between pixels according to an example embodiment of the disclosure.

FIG. 7 is a diagram illustrating an influence between pixels according to an example embodiment of the disclosure. As shown in FIG. 7, a black unit refers to a unit with a strong parallax belief, that is, robust matching, and a white unit refers to a unit with a weak parallax belief. The parallax belief may be transferred from the black unit to the other two white units. However, the size of a convolutional layer kernel 710 is limited, and many convolutional layers or larger convolutional kernels may be stacked for belief transfer. Therefore, a matching cost propagation module 720 based on parallax belief propagation may be used. An output of the stacked hourglass module structure of the CNN module includes four dimensions, namely channel, parallax, height, and width, and a channel size may be compressed to obtain a three-dimensional matching cost, that is, parallax, height, and width. A matching cost may be divided along the height or width dimension to transfer the parallax belief from one side to the other side.

Figure 8:
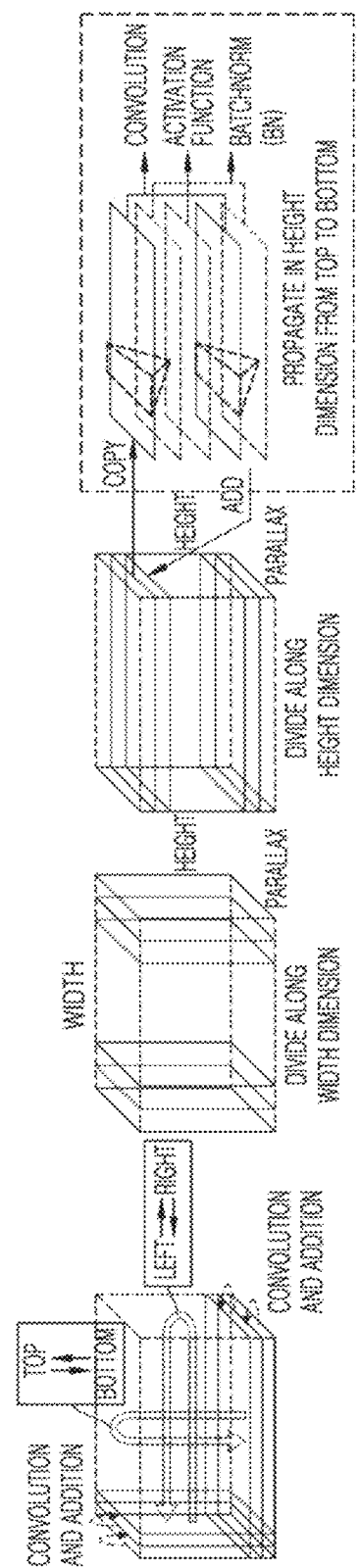
FIG. 8 is a diagram illustrating propagation of matching costs in a height dimension from top to bottom, according to an example embodiment of the disclosure.

FIG. 8 is a diagram illustrating propagation of matching costs from top to bottom in a height dimension, according to an example embodiment of the disclosure. As shown in FIG. 8, the propagation in the height dimension from top to bottom is described. When obtaining a slice with a shape of "parallax*1*width", the slice may be copied i times and a two-dimensional convolutional layer with a convolutional kernel size of 1*kw may be added, whose input and output channels are both D, that is, a parallax dimension in a current matching cost. In addition, a Batchnorm(BN) layer may be added before nonlinear activation, and then another convolution and BN layers are added (without activation). Accordingly, a parallax propagation module according to an example embodiment of the disclosure may not propagate units with low parallax beliefs in a global range.

The matching cost obtaining unit 222 may obtain a matching cost matrix based on a first feature image of a monocular image. In other words, the matching cost obtaining unit 222 may obtain an initial matching cost matrix based on the first feature image of the monocular image, and input the initial matching cost matrix to a neural network (only as an example and not a limitation, the neural network may be a hourglass convolutional network or a multi-layer three-dimensional convolutional neural network (3D CNN)) to perform convolution to obtain the matching cost matrix. The matching cost obtaining unit 222 may connect a left feature image $F_l$ and a right feature image $F_r$ whose feature dimensions are H*W*C according to a parallax direction to obtain the initial matching cost matrix. In detail, when the parallax is 0, the matching cost obtaining unit 222 may directly connect the left and right feature images to obtain a matrix with a dimension H*W*2C. When the parallax is d, the matching cost obtaining unit 222 may first translate the right feature image along a predetermined direction (only as an example and not a limitation, a horizontal direction) by d (wherein d is a positive integer) column, and then connect the left and right feature images to obtain a matrix with a dimension H*W*2C. Assuming that a range of the parallax value d is 0 to DD (wherein DD is a positive integer), the matching cost obtaining unit 222 may sequentially translate the right feature images according to the size of the parallax, and connect the left and right feature images to obtain a matrix with a dimension H*W*2C*D, that is, the initial matching cost matrix. Subsequently, the matching cost obtaining unit 222 may input the initial matching cost matrix to the neural network such as the hourglass convolutional network or the multi-layer 3D CNN to perform convolution to obtain a matching cost matrix (the dimension is H*W*D).

In addition, the matching cost obtaining unit 222 may input the initial matching cost matrix to the above-stated neural network such as the hourglass convolutional network or the multi-layer 3D CNN to obtain matching cost matrices of different scales.

The cost aggregation unit 223 may perform cost aggregation on a matching cost matrix. Herein, the cost aggregation unit 223 may perform cost aggregation on the matching cost matrix based on a graph neural network (GNN). In detail, the cost aggregation unit 223 may obtain a neighboring node of each central node that is an element of the matching cost matrix according to a distance and obtain a matching cost matrix of a first generation of cost aggregation by updating a matching cost of each central node based on a weight of each neighboring node and the matching cost of the neighboring node.

Descriptions below will be provided with reference to FIGS. 9 and 10.

Figure 9:
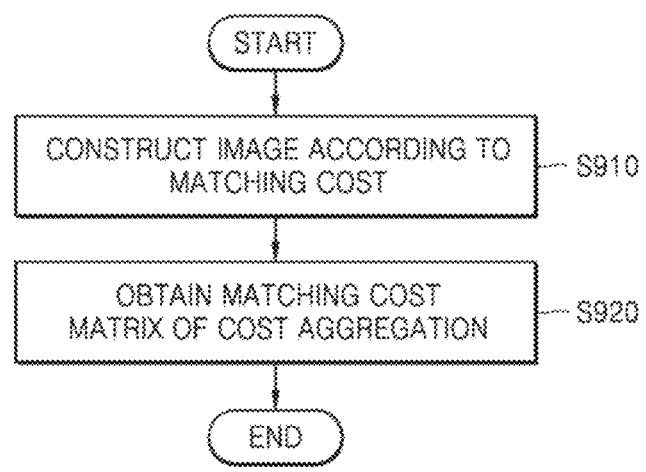
FIG. 9 is a flowchart illustrating a method of a cost aggregation unit according to an example embodiment of the disclosure performing cost aggregation based on a graph neural network (GNN)
Figure 10:
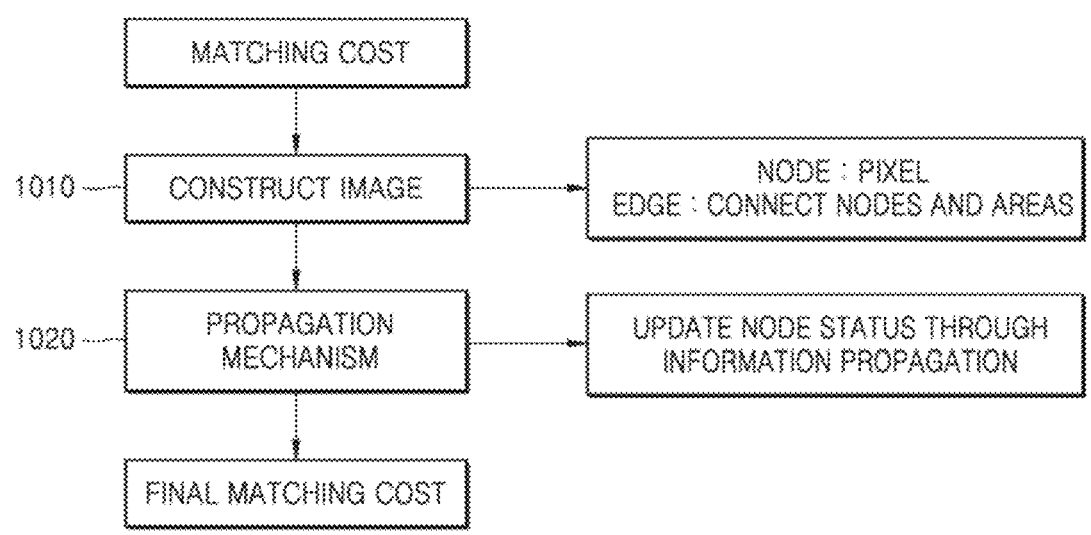
FIG. 10 is a diagram illustrating a method of a cost aggregation unit according to an example embodiment of the disclosure performing cost aggregation based on a graph neural network.

FIG. 9 is a flowchart illustrating a method of the cost aggregation unit 223 according to an example embodiment of the disclosure performing cost aggregation based on a graph neural network (GNN). FIG. 10 is a diagram illustrating a method of the cost aggregation unit 223 according to an example embodiment of the disclosure performing cost aggregation based on a GNN.

As shown in FIG. 9, in operation S910 and S1010, the cost aggregation unit 223 may construct an image according to a matching cost matrix. In detail, each element of the matching cost matrix is taken as a central node, resulting in a total of H*W central nodes, and each central node is configured by position information and feature information (f, the dimension is D). The cost aggregation unit 223 may obtain a particular number k (k may be set by those of ordinary skill in the art according to an actual situation) other central nodes $n_1, n_2, \ldots, n_k$ (that is, neighboring nodes) that are closest in distance to each central node, and connect each central node with the k other central nodes, of which a corresponding distance is the closest, to form an edge, thereby constructing the image G. The distance may be a spatial distance, a feature vector distance, or a weighted sum of the spatial distance and the feature vector distance. In detail, the distance may be calculated through an Euclidean distance.

In operation S920 and S1020, the cost aggregation unit 223 may connect the k other central nodes (also referred to as k neighboring nodes) corresponding to each central node along a feature dimension (that is, the feature dimension of each neighboring node is D, and a total dimension after the connection is k*D) and input the same to a neural network (only as an example and not a limitation, the neural network may be a multilayer perception network) to obtain weights $w_1, w_2, \ldots, w_k$ of each central node and edges of the k other central nodes of which the corresponding distance is the closest, and update a matching cost of each central node based on the weight and matching cost matrices of the k other central nodes, of which the corresponding distance is the closest, to obtain a matching cost matrix of a first generation of cost aggregation. In detail, the cost aggregation unit 223 may update the matching cost matrix through the following Equation (3):

$$f_{current1} = a_1 * \sigma(\Sigma_{i=1}^{k} w_i f_i) + b_1 * f_{before1} \quad (3)$$

wherein $w_i$ is the weight of the edges of the k other central nodes of which the corresponding distance is the closest, $f_i$ is the matching cost of the k other central nodes of which the corresponding distance is the closest, $f_{before1}$ is the matching cost before the central node is updated, $f_{current1}$ is the matching cost after the central node is updated, $\sigma$ is an activation function, $a_1$ and $b_1$ are predetermined constants, and k is a positive integer. Through the above operations, feature propagation may be performed between pixels. A longer range of dependencies between pixels may be captured after multiple iterations, thereby transferring extracted robust features to an ill-conditioned area.

In addition, the cost aggregation unit 223 may also use a second feature image $F_{seg}$ to guide the cost aggregation. Herein, the second feature image is generated based on a semantic segmentation neural network or the second feature image is the same as the first feature image. In detail, the cost aggregation unit 223 may obtain a neighboring node of each pixel of the second feature image according to a distance, find a neighboring node of each central node that is an element of a matching cost matrix according to a pixel correspondence relationship between the second feature image and a matching cost, obtain a matching cost matrix of a second generation of cost aggregation by updating the matching cost of each central node based on a weight and matching cost of neighboring nodes, and obtain a matching cost matrix of a third generation of cost aggregation by aggregating the matching cost of the first generation of cost aggregation and the matching cost of the second generation of cost aggregation. The cost aggregation unit 223 may first construct an image based on $F_{seg}$. Herein, each element of the matching cost matrix is taken as a central node, resulting in a total of H*W central nodes, and each central node is configured by position information and feature information (f, dimension is D). Because each central node of the matching cost matrix is in a one-to-one correspondence relationship with each pixel of $F_{seg}$, the cost aggregation unit 223 may obtain a particular number k (k may be set by those of ordinary skill in the art according to an actual situation) of other pixels (that is, neighboring pixels) that are closest in distance to each pixel of $F_{seg}$ to obtain the k other central nodes (that is, neighboring nodes) that are closest in distance to each central node. Subsequently, the cost aggregation unit 223 may obtain K (k is a positive integer) other central nodes $n_1, n_2, \ldots, n_k$, which are closest in distance to pixels of $F_{seg}$ of each central node, and connect each central node and the k other central nodes, of which a corresponding distance is the closest, to form the image G. The distance may be a spatial distance, a feature vector distance, or a weighted sum of the spatial distance and the feature vector distance. In detail, the distance may be calculated through an Euclidean distance. Subsequently, the cost aggregation unit 223 may connect the k other central nodes corresponding to each central node along a feature dimension and input the same to the above-stated neural network such as a multilayer perception network to obtain weights $w_1, w_2, \ldots, w_k$ of each central node and edges of the k other central nodes of which the corresponding distance is the closest, update a matching cost of each central node based on the weight and matching cost matrices of the k other central nodes, of which the corresponding distance is the closest, to obtain a matching cost matrix of a second generation of cost aggregation, and aggregate the matching cost matrix of the first generation of cost aggregation and the matching cost matrix of the second generation of cost aggregation to obtain a matching cost matrix of a third generation of cost aggregation. In detail, the cost aggregation unit 223 may update the matching cost matrix through the following Equation (4):

$$f_{current2} = a_2 * \sigma(\Sigma_{i=1}^{k} w_i f_i) b_2 * f_{before2} \quad (4)$$

wherein $w_i$ is the weight of the edges of the k other central nodes of which the corresponding distance is the closest, $f_i$ is the matching cost of the k other central nodes of which the corresponding distance is the closest, $f_{before2}$ is the matching cost before the central node is updated, $f_{current2}$ is the matching cost after the central node is updated, a is an activation function, $a_2$ and $b_2$ are predetermined constants, and k is a positive integer.

The matching cost matrix of the third generation of cost aggregation obtained in such a method includes not only the matching cost aggregation guided by depth estimation, but also the cost matching aggregation guided by semantic segmentation, such that the accuracy may be improved.

In addition, other example embodiments may also be used, as follows:

Stereo image matching may provide a convincing dense depth image without a depth sensor, and has been widely concerned in modern applications. Effective matching cost aggregation is the key to a stereo matching task. Although traditional methods and deep neural networks have developed some effective cost aggregation methods, finding a correct matching relationship in an ill-conditioned area is still difficult, and the use of long-term contextual information may alleviate this difficulty. Compared with previous work using multilayer three-dimensional convolution, a new guide graph convolutional module (GGCM) may be used to solve the problem. The GGCM constructs an image according to a similarity degree of a guidance image and learns global background information through a multilayer superimposing GGCM module. The vertices of the image are pixels, and may be constructed as a K-neighboring image according to a similarity distance. In addition, an effective distance calculation method may be defined and compared with an existing GCN method. The distance includes two portions, one is a spatial distance used for modeling a spatial relationship, and the other portion is defined is a particular feature space of a guidance image, which may explore non-local pixel similarity and retain boundary information. The method is non-local because each node receives information from all other nodes on the image after multiple convolution iterations.

A current stereo matching method usually uses two operations of downsampling and upsampling in a three-dimensional convolutional layer to perform cost aggregation, and a reduced resolution results in blurry edges of a parallax image. A guidance image filtering method proves that an edge of a depth image may be maintained by the filtering based on image guidance. Therefore, graphics may be automatically constructed according to a guidance image and applied to graph convolution calculation to adaptively aggregate cost features.

In detail, given a feature image of the guidance image (the dimension is H*W*C) and input a matching cost matrix C (the dimension is H*W*D). Each element of the matching cost matrix may be taken as a central node, resulting in a total of H*W central nodes, and each central node is configured by feature information (dimension is D).

First, an image G is constructed according to a similarity distance (N vertices, and each vertex has k neighbors and k edges). The vertices (the dimension is N=H*W) of the image are all pixel units of tensor, and edges (dimension is k*N) are generated between k neighboring pixels. An effective distance function $d_u$ may be defined, as shown in the following Equation (5).

$$d_{ij} = \sqrt{(x_i - x_j)^2 + (y_i - y_j)^2} + \sqrt{\frac{1}{|C|}\sum_{k=0}^{C}(f_{ic}^l - f_{jc}^l)^2} \quad (5)$$

wherein the distance may include two portions, wherein one portion is coordinates of spatial distance pixel points modeling a spatial relationship expressed as $(x_i, y_i)$, $(x_j, y_j)$. The first term in the Equation (5) is the Euclidean distance of two-pixel coordinates, and the second term in the Equation (5) is defined in a feature space of the guidance image and is used to utilize non-local pixel similarity and retain depth edge information. For a feature image l, each pixel has a feature vector $f_i$ (common C dimension, each dimension is represented as $f_{ic}$) or $f_j$ (common C dimension, each dimension is represented as $f_{jc}$). A distance in the feature space represents the Euclidean distance of the two feature vectors, and l represents an l-th layer of the convolution.

Secondly, the matching cost units are adaptively aggregated by performing weighted summation on the k neighboring pixels.

Figure 11:
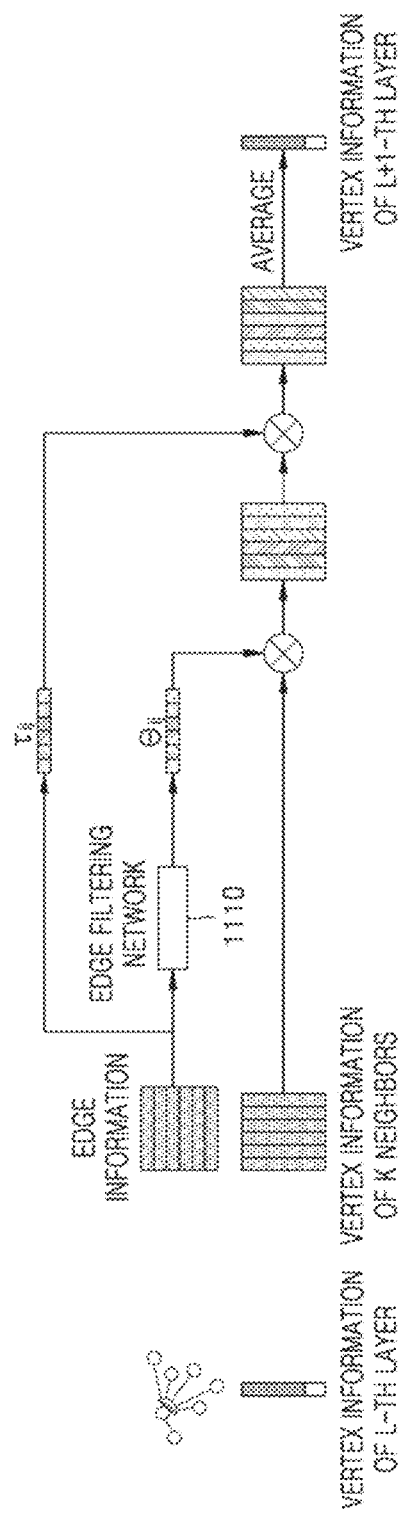
FIG. 11 is a diagram of an operation of an aggregation function according to an embodiment of the disclosure.

FIG. 11 is a diagram of an operation of an aggregation function according to an example embodiment of the disclosure. As shown in FIG. 11, aggregation weights are estimated by an edge filter network 1110, and a data-driven method depending on cost units is used instead of predefined parameterized operations. The aggregation function is shown in Equation (6) below.

$$v_{iaggre}^{l+1} = \frac{1}{|N(i)|} \sum_{u_j^l \in N(v_i^l)} E^l(L^l(i,j)) F^l(L^l(i,j); w^l) u_j^l \quad (6)$$

$$= \frac{1}{|N(i)|} \sum_{u_j^l \in N(v_i^l)} \gamma_{ij}^l \theta_{ij}^l u_j^l$$

wherein $v_{iaggre}^{l+1}$ represents vertex information. An edge filter network $F^l$ may take edge information $L^l(i,j)$ as an input and output a weight matrix $\theta_{ij}$. $W^l$ represents a learnable parameter, $u_j^l$ represents a neighboring node of $v_i^l$, $E^l$ represents an edge attention function, N(i) represents the number of neighboring nodes, l represents the l-th layer of convolution, and $\gamma_{ij}$ represents an edge-attention parameter.

Finally, the vertex information $v_{iaggre}^{l+1}$ after aggregation and original vertex information $v_i^l$ are used to update a matching cost matrix, as shown in the following Equation (7), wherein w is a fixed parameter.

$$v_i^{l+1} = w \times v_{iaggre}^{l+1} + (1-w) \times v_i^l \quad (7)$$

In addition, the cost aggregation unit 223 may also obtain a temporary matching cost matrix according to multiple matching cost matrices of different scales, obtain a probability that each element of the temporary matching cost matrix corresponds to a predetermined parallax, and obtain a matching cost matrix according to the probability and the temporary matching cost matrix. In detail, the cost aggregation unit 223 may convert (such as upsampling) the matching cost matrices cost1, cost2, . . . , costk of different scales into the same size (the dimension is H*W*D) and connect the same along a parallax dimension as shown in the following Equation (8) to obtain the temporary matching cost matrix (the dimension is H*W*kD). Subsequently, the cost aggregation unit 223 may obtain a probability that each element of the temporary matching cost matrix corresponds to a predetermined parallax, based on the temporary matching cost matrix. Herein, the cost aggregation unit 223 may obtain a probability P that each element of the temporary matching cost matrix corresponds to a predetermined parallax by using a softmax function, as shown in the following Equation (9). Finally, the cost aggregation unit 223 may multiply the probability P with the temporary matching cost matrix, as shown in the following Equation (10), to obtain a matching cost matrix. After experimental verification, the use of this strategy may effectively improve the accuracy of generating parallax images.

$$\text{cost}_{temp} = \text{concat}(\text{cost1}, \text{cost2}, \ldots, \text{costk}) \quad (8)$$

$$P = F_{softmax}(\text{cost}_{temp}) \quad (9)$$

$$\text{cost}_{new} = \text{cost}_{temp} * P \quad (10)$$

wherein cost1, cost2, . . . , costk represent k matching cost matrices of different scales, $\text{cost}_{temp}$ represents the temporary matching cost matrix, P represents the probability that each element of the temporary matching cost matrix $\text{cost}_{temp}$ corresponds to the predetermined parallax, $\text{cost}_{new}$ represents a newly obtained matching cost matrix (that is, a matching cost matrix of a sixth generation of cost aggregation), and k is a positive integer.

In addition, the cost aggregation unit 223 may also guide matching cost aggregation based on a similarity matrix, that is, a fifth matching cost matrix may be obtained based on the similarity matrix and the matching cost matrix. In detail, the cost aggregation unit 223 may use the similarity matrix (dimension: HW*HW) to perform a convolution operation on the matching cost matrix obtained by the matching cost obtaining unit 222. A parameter during the convolution operation is determined by the similarity matrix. A particular operation is to convert matching cost matrix (H*W*D) into a two-dimensional matching cost matrix (HW*D), perform multiplication (HW*HW)*(HW*D) of the similarity matrix and the two-dimensional matching cost matrix to obtain a new matrix HW*D, and then change the dimension to obtain a fifth matching cost matrix (H*W*D).

It may be understood that the cost aggregation unit 223 may be added as a separate portion to an existing stereo matching network or depth estimation network to improve the performance of the existing network.

Utilizing context information to perform cost aggregation in stereo matching is very effective for improving matching accuracy. However, deep learning networks often perform cost aggregation on a four-dimensional matching cost matrix. The four-dimensions are feature, parallax, image height, and image width. However, generating a parallax image by using the four-dimensional matching cost matrix may require compressing the feature dimension and parallax dimension. In the related art, a fully connected layer is often used to perform parallax calculation for pixel-by-pixel. In this process, no context information is referenced, which causes an error in parallax generation. According to an example embodiment of the disclosure, after compressing the feature dimension, propagation based on matching confidence of context may be performed on a three-dimensional matching cost matrix to improve the accuracy of calculating the parallax of each pixel during compressing the dimension. In detail, the first obtaining unit 110 may include a matching probability obtaining unit configured to calculate a probability Pd (only as an example and not a limitation, a Softmax function may be used to perform calculation) that each element (x,y) of a matching cost matrix obtained by the matching cost obtaining unit 222 corresponds to a predetermined parallax D to convert a three-dimensional matching cost matrix into a three-dimensional matching probability matrix C (H*W*D). Subsequently, a confidence propagation algorithm may be used to optimize the matching probability matrix C, and the confidence propagation algorithm may be simplified to a layer-by-layer convolution process with the matching probability matrix, that is, performing a convolution operation on the matching probability matrix (H*W*D).

In other words, the cost aggregation unit 223 may be replaced with the matching probability obtaining unit that perform the above-stated matching probability calculation, and the depth image generation unit 224 may generate a depth image of each monocular image based on the matching probability matrix. According to an example embodiment, when implementing a differentiable confidence propagation algorithm in the matching probability matrix, a value in the probability matrix is converted from a probability space to a logarithmic space to fit the confidence propagation algorithm by using a convolution process. In the process, a guidance image describing a similarity degree between neighbor pixels is obtained to participate in the calculation. The operation of the calculation is that convolution kernel parameters in the convolution process are determined by pixel values at corresponding positions of the guidance image. The guidance image may be converted by some feature images obtained during the convolution process, or converted by optical flow and semantic segmentation results of an image.

The depth image generation unit 224 may generate a depth image of each monocular image based on a matching cost matrix of cost aggregation. Herein, the depth image generation unit 224 may generate a depth image of each monocular image by using any one of the matching cost matrix of the first generation of cost aggregation, the matching cost matrix of the third generation of cost aggregation, a matching cost matrix of a fourth generation, and a matching cost matrix of a fifth generation obtained by the cost aggregation unit 223. According to an example embodiment of the disclosure, the depth image generation unit 224 may first generate a parallax image disp(H*W) of each monocular image based on a matching cost matrix of cost aggregation or a matching probability matrix, and then may generate a depth image of each monocular image based on the parallax image disp of each monocular image. In detail, the depth image generation unit 224 may calculate a probability Pal that each element $C_d$ ($x_i, y_i$) of the matching cost matrix of the aggregation or the matching probability matrix corresponds to a parallax dimension D by using a softmax function, and then multiplies and sums all parallax values di and the corresponding probability $P_{di}$ to serve as a parallax value of a current pixel of the monocular image, as shown in the following Equation (11).

$$\hat{d} = \Sigma_{di=0}^{DD} d_i * \text{softmax}(-c_d) \quad (11)$$

wherein di represents the parallax value, $c_d$ represents the element of the matching cost matrix of aggregation or matching probability matrix, $\hat{d}$ represents the parallax value of the current pixel, and DD represents a maximum value of the parallax value.

Subsequently, the depth image generation unit 224 may calculate a depth image of each monocular image through $$Z = \frac{b * f}{d},$$

wherein b represents a distance between optical centers of two cameras obtaining two monocular images, f represents a focal length of two cameras obtaining two monocular images, and d is a parallax value of the obtained parallax image.

In addition, according to an example embodiment of the disclosure, the depth image generation unit 224 may further include a reliable depth obtaining unit. The reliable depth obtaining unit may compare pixels at corresponding positions between depth images of each monocular image to obtain a reliable depth image, wherein a depth difference value of a pixel at a corresponding position is greater than or equal to a predetermined threshold value, the pixel at the corresponding position may be determined as an unreliable pixel, and when a depth difference value of a pixel at a corresponding position is less than the predetermined threshold value, the pixel at the corresponding position may be determined as a reliable depth image. In detail, the reliable depth obtaining unit may set a pixel value of an unreliable pixel to 0 and set a pixel value of a reliable pixel to 1, thereby obtaining a reliable depth image. Subsequently, the reliable depth obtaining unit may process a first feature image, an initial matching cost matrix, and a matching cost matrix according to the reliable depth image. In detail, the reliable depth obtaining unit may remove an occlusion area by multiplying the reliable depth image and the first feature image obtained by the feature extraction unit 221 or the initial matching cost matrix or matching cost matrix obtained by the matching cost obtaining unit 222 and then transfer the result of multiplication to surrounding pixels, thereby increasing a feature/matching cost, retaining a reliable feature of matching cost, and improving the accuracy of generated depth images. Herein, after the reliable depth obtaining unit multiplies the reliable depth image with the first feature image obtained by the feature extraction unit 221 or the initial matching cost matrix or matching cost matrix obtained by the matching cost obtaining unit 222, the matching cost obtaining unit 222 may obtain the initial matching cost matrix based on the product of the reliable depth image and the first feature image and may obtain the matching cost matrix based on the product of the reliable depth image and the initial reliable depth image, and the cost aggregation unit 223 may perform cost aggregation on the product of the reliable depth image and the matching cost matrix.

Figure 12:
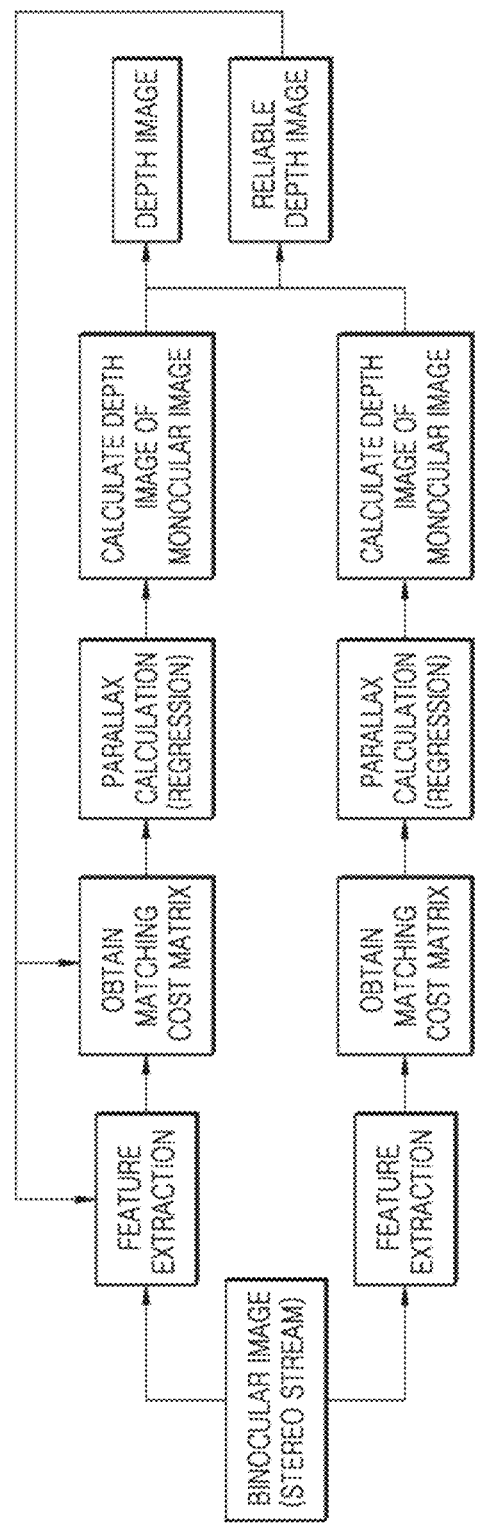
FIG. 12 is a diagram illustrating a method of a reliable depth obtaining unit according to an example embodiment performing a feature/matching cost increasing operation.

FIG. 12 is a diagram illustrating a method of a reliable depth obtaining unit according to an example embodiment performing a feature/matching cost increasing operation. As shown in FIG. 12, the reliable depth obtaining unit may transfer the product of a reliable depth image and a feature map or a matching cost matrix to surrounding pixels in subsequent processing.

In addition, according to an example embodiment of the disclosure, in the training of a neural network configured by the first obtaining unit 110, an error between a calculated parallax value and a labeled parallax value may be backpropagated as a first loss function to train the neural network. Real scene data sets mostly use sparse LiDAR data as annotation, and a lot of unannotated data is presented in an image. In the training process, sparse labeling may only constrain some pixels, and there is no effective constraint for unlabeled pixels. According to an example embodiment of the disclosure, a left-right consistency direction method is used to perform constraints on unlabeled pixels. In other words, with respect to the unlabeled pixels, a calculated parallax image of a monocular image is mapped to parallax image of a corresponding other monocular image, and a difference between the calculated parallax image of the other monocular image and the mapped parallax image of the corresponding other monocular image is used as a loss function of the unlabeled pixels for backpropagation. In addition, the loss function of the unlabeled pixels may be used as the first loss function together with a loss function of labeled pixels for backpropagation for the training of the neural network configured by the first obtaining unit 110. In detail, as shown in the following Equation (12), the calculated parallax image of the monocular image is mapped to a parallax image of a corresponding other monocular image (only as an example and not a limitation, a right parallax image is mapped to a left parallax image) to generate a parallax image of a new other monocular image. Then, as shown in the following Equation (13), the difference $L_{warp\_consistance}$ between the calculated parallax image of the monocular image and the mapped parallax image of the corresponding other monocular image is calculated, and as shown in the following Equation (14), the loss is used together with the loss function $L_{smooth}$ of the labeled pixels for the training of the neural network configured by the first obtaining unit 110.

$$I_L^{warp}(x_l,y) = I_R(x_l - D_l(x_l,y), y) \quad (12)$$

$$L_{warp\_consistance} = |I_L(x_l,y) - I_L^{warp}(x_l,y)| \quad (13)$$

$$L = L_{smooth} + L_{warp\_consistance} \quad (14)$$

wherein $I_L^{warp}(x_l,y)$ represents a new parallax image of a left image generated from a right image, $D_l(x_l,y)$ represents a value of a pixel $(x_l,y)$, $(x_l-D_l(x_l,y),y)$ represents new pixel coordinates obtained by translating a pixel $(x_l,y)$ by $D_l(x_l,y)$ leftward, $I_R(x_l-D_l(x_l,y),y)$ represents a pixel value in the right image to which a pixel $(x_l-D_l(x_l,y),y)$ corresponds, $L_{warp\_consistance}$ represents a consistency loss function of the unlabeled pixels, $L_{smooth}$ represents the loss function of labeled pixels, and L represents the first loss function. In addition, it may be noted that Equations (12) to (14) and the left image, right image, leftward, or the like described in the description of this paragraph are only examples, and those of ordinary skill in the art may perform corresponding processing according to an actual situation of a binocular image.

Figure 13:
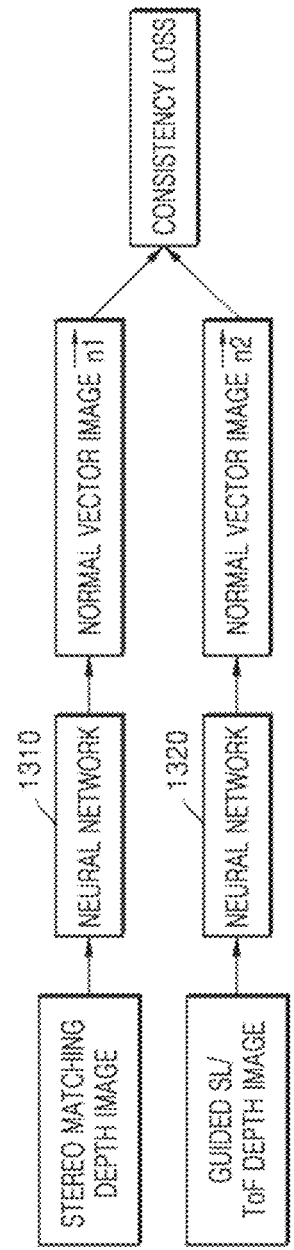
FIG. 13 is a diagram of a geometric consistency optimization operation according to an example embodiment of the disclosure.

FIG. 13 is a diagram of a geometric consistency optimization operation according to an example embodiment of the disclosure. As shown in FIG. 13, in the training of a neural network configured by the first obtaining unit 110 and the second obtaining unit 120, a first depth image may be input to a neural network 1310 (only as an example and not a limitation, the neural network 1310 may be a CNN) and a second depth image may be input to another neural network 1320 (only as an example and not a limitation, the other neural network 1320 may be a CNN) to respectively obtain a first normal vector image $\vec{n1}$ and a second normal vector image $\vec{n2}$, and generate a high-quality depth image through consistency constraints of the normal vector images. In detail, a difference between the first normal vector image $\vec{n1}$ and the second normal vector image $\vec{n2}$ may be used as a second loss function for backpropagation for the training of the neural network configured by the first obtaining unit 110 and the second obtaining unit 120. According to an example embodiment of the disclosure, the difference between the first normal vector image $\vec{n1}$ and the second normal vector image $\vec{n2}$ may be calculated by the following Equation (15). Herein, although depth images may also be optimized by using existing traditional methods or deep learning networks, the disclosure optimizes depth images obtained by a plurality of sensors together and uses geometric constraints between the depth images to obtain a more consistent depth image, thereby obtaining a high-quality depth image.

$$L_{con} = \arccos \frac{\vec{n1} \cdot \vec{n2}}{\|\vec{n1}\| \cdot \|\vec{n2}\|} \quad (15)$$

In addition, when training a model (depth estimation training in example), a large amount of labeled data may be required to supervise a network to learn a task, for example, the depth estimation in the disclosure. However, the labeled data in practice may require a lot of manpower and material resources. Synthetic data and actual data may be used as a training set to test on actual data to save resources. In this case, a network structure configured by a depth image generation device may be modified to turn a regression network structure into a two-task network structure, that is, regression and classification. Most of the two tasks are shared by parameters. The branch of classification problem may require a network to correctly classify the synthetic data and the actual data and minimize an error of binary classification, and the branch of regression problem may require the network to minimize a regression error and obtain correct depth estimation. To achieve domain adaptation, the network structure configured by the depth image generation device may be divided into three portions, namely, a shared coding module, a regression module, and a classification module. To simultaneously train the network configured by the depth image generation device without generating ambiguity, a gradient inversion layer may be used, wherein network parameters before the layer will be regressed towards an angle of encoding data of two fields into a similar distribution to obtain optimal depth estimation, and the network parameters after the layer will be optimized in a direction of reducing domain classification loss.

Figure 14:
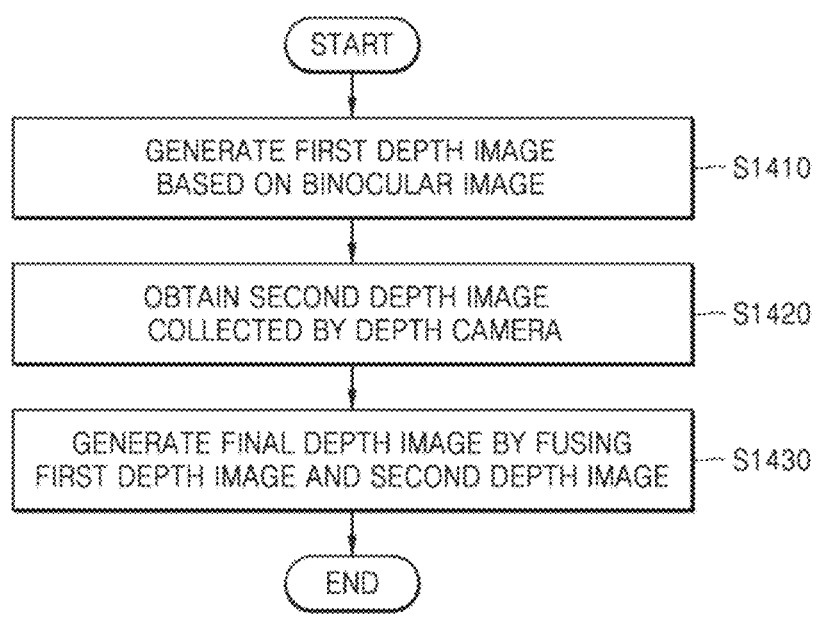
FIG. 14 is a flowchart of a depth image generation method according to an example embodiment of the disclosure.

FIG. 14 is a flowchart of a depth image generation method according to an example embodiment of the disclosure.

As shown in FIG. 14, in operation S1410, a first depth image may be generated based on a binocular image.

In operation S1420, a second depth image collected by a depth camera may be obtained.

In operation S1430, a final depth image may be generated by performing image fusion on the first depth image and the second depth image.

The obtaining of the second depth image may include: extracting a depth feature from a third depth image; and generating the second depth image, in which depth completion is performed, by performing, on the extracted depth features, filtering guided by a similarity matrix, wherein the similarity matrix is generated based on the binocular image.

The generating of the second depth image in which depth completion is performed may include: obtaining a similarity degree between a current pixel of a depth image and a neighboring pixel of the current pixel based on the similarity matrix; and performing filtering on a depth feature of the current pixel according to a predetermined direction based on a depth feature of the neighboring pixel and the similarity degree.

The predetermined direction may include any one or any combination of a direction from top to bottom, a direction from bottom to top, a direction from left to right, and a direction from right to left.

The generating of the first depth image may include: obtaining a first feature image of each monocular image included in the binocular image; obtaining a matching cost matrix based on the first feature image of the monocular image; performing cost aggregation on the matching cost matrix; and generating a depth image of each monocular image based on the matching cost matrix of the cost aggregation.

The generating of the first depth image may further include obtaining a reliable depth image of each monocular image by performing consistency detection on the depth image of each monocular image.

The obtaining of the first feature image may include performing feature extraction on the binocular image based on a neural network of an attention mechanism.

The obtaining of the matching cost matrix may include: obtaining an initial matching cost matrix based on the first feature image of the monocular image; and obtaining the matching cost matrix by performing convolution by inputting the initial matching cost matrix to a predetermined neural network.

The performing of the cost aggregation may include performing cost aggregation on the matching cost matrix based on a graph neural network (GNN).

The performing of the cost aggregation may include: obtaining a neighboring node of each central node that is an element of the matching cost matrix according to a distance; and obtaining a matching cost matrix of a first generation of cost aggregation by updating a matching cost of each central node based on a weight of each neighboring node and the matching cost of the neighboring node.

The performing of the cost aggregation may further include using a second feature image to guide the cost aggregation.

The second feature image may be generated based on a semantic segmentation neural network or the second feature image may be the same as the first feature image.

The performing of the cost aggregation may include: obtaining a neighboring node of each pixel of the second feature image according to a distance, finding a neighboring node of each central node that is an element of a matching cost matrix according to a pixel correspondence relationship between the second feature image and a matching cost; obtaining a matching cost matrix of a second generation of cost aggregation by updating the matching cost of each central node based on a weight and matching cost of neighboring nodes; and obtaining a matching cost matrix of a third generation of cost aggregation by aggregating the matching cost of the first generation of cost aggregation and the matching cost of the second generation of cost aggregation.

The distance may be a spatial distance, a feature vector distance, or a weighted sum of the spatial distance and the feature vector distance.

The performing of the cost aggregation may include: obtaining a temporary matching cost matrix according to multiple matching cost matrices of different scales, obtaining a probability that each element of the temporary matching cost matrix corresponds to a predetermined parallax; and obtaining a fourth matching cost matrix according to the probability and the temporary matching cost matrix.

The performing of the cost aggregation may include obtaining a fifth matching cost matrix based on a similarity matrix and the matching cost matrix, wherein the similarity matrix may be generated based on the binocular image.

The generating of the first depth image may include: obtaining a first feature image of each monocular image included in the binocular image by performing feature extraction by inputting the binocular image to a predetermined neural network; obtaining a matching cost matrix based on the first feature image of the monocular image; calculating a probability that each element of the matching cost matrix corresponds to a predetermined parallax to convert the matching cost matrix into a matching probability matrix; and generating a depth image of each monocular image based on the matching probability matrix.

The obtaining of the reliable depth image may include comparing pixels at corresponding positions between depth images of each monocular image to obtain a reliable depth image, wherein a depth difference value of a pixel at a corresponding position is greater than or equal to a predetermined threshold value, the pixel at the corresponding position may be determined as an unreliable pixel, and when a depth difference value of a pixel at a corresponding position is less than the predetermined threshold value, the pixel at the corresponding position may be determined as a reliable depth image.

The obtaining of the reliable depth image may include processing the first feature image, the initial matching cost matrix, and the matching cost matrix according to the reliable depth image.

In addition, according to an example embodiment of the disclosure, an electronic device may be further provided, the device including a memory and a processor, wherein the memory stores computer-executable instructions that, when executed by the processor, cause the processor to perform the above-stated method. In addition, according to an example embodiment of the disclosure, a computer-readable medium may be further provided, the medium storing computer-executable instructions thereon, wherein execution of the instructions causes the above-stated method to be performed.

According to an example embodiment of the disclosure, a high-accuracy depth image may be generated by performing optimization with respect to problems of noise, sparseness, low resolution, or the like existing in depth images obtained by sensors and a problem of poor accuracy when performing depth estimation in an ill-conditioned area based on a depth learning method. In addition, a completed depth image with high resolution may be generated by performing filtering on a depth image obtained by a sensor by using a binocular image. In addition, a high-accuracy depth image may be generated by extracting robust features by using a stereo matching deep learning network and transferring the robust features to ill-conditioned areas. In addition, a high-quality depth image may be generated by jointly optimizing a first depth image and a depth-completed second feature image through consistency constraints by using a depth optimization network. In addition, through a high-quality depth image generation method based on multi-sensors, a high-quality depth image may be obtained by using advantages of each depth sensor, and the method is applicable in other difficult scenarios.

Although the disclosure has been shown and described with reference to the example embodiments, those of ordinary skill in the art may understand that changes in forms and details may be made without departing from the spirit and scope of the disclosure as defined by the claims.

The computer-readable medium may include a computer-readable non-transitory medium in which a program for executing the depth image generation method on a computer is recorded.

The above-described example embodiments can be written as a program that can be executed on a computer, and can be implemented in a general-purpose digital computer that operates the program using a medium that can be read by a non-transitory computer. In addition, the structure of the data used in the above-described example embodiments may be recorded on a computer-readable medium through various means. The computer-readable medium includes a storage medium such as a magnetic storage medium (for example, a ROM, a floppy disk, a hard disk, etc.) and an optical reading medium (for example, a CD-ROM, a DVD, etc.).

Those of ordinary skill in the technical field related to the example embodiment will appreciate that the example embodiment may be implemented in a modified form within a range not departing from the characteristics of the above-described description. Therefore, the disclosed example embodiments may be considered from an illustrative point of view rather than a limiting point of view. The scope of the rights is shown in the claims rather than the above description, and all differences within the scope equivalent thereto may be construed as being included in the present example embodiment.

What is claimed is:

1. A depth image generation method comprising:
obtaining a first depth image, based on a binocular image;
obtaining a second depth image, using a depth camera; and
obtaining a final depth image by performing image fusion on the obtained first depth image and the obtained second depth image,
wherein the obtaining the second depth image comprises:
extracting a depth feature from a third depth image that is obtained using the depth camera; and
obtaining the second depth image, on which depth completion is performed, by performing, on the extracted depth feature, filtering that is guided by a similarity matrix, and
wherein the similarity matrix is obtained based on the binocular image.

2. The depth image generation method of claim 1, wherein the generating of the second depth image, on which the depth completion is performed, comprises:
obtaining a similarity degree between a current pixel of a depth image and a neighboring pixel of the current pixel, based on the similarity matrix; and
performing filtering on a depth feature of the current pixel according to a predetermined direction, based on a depth feature of the neighboring pixel and the obtained similarity degree.

3. The depth image generation method of claim 2, wherein the predetermined direction comprises any one or any combination of a direction from top to bottom, a direction from bottom to top, a direction from left to right, and a direction from right to left.

4. The depth image generation method of claim 1, wherein the obtaining of the first depth image comprises:
obtaining a first feature image of each monocular image included in the binocular image;
obtaining a matching cost matrix, based on the obtained first feature image of each monocular image;
performing cost aggregation on the obtained matching cost matrix; and
obtaining a depth image of each monocular image, based on the matching cost matrix on which the cost aggregation is performed.

5. The depth image generation method of claim 4, wherein the obtaining of the first depth image further comprises obtaining a reliable depth image of each monocular image by performing consistency detection on the obtained depth image of each monocular image.

6. The depth image generation method of claim 4, wherein the obtaining of the first feature image comprises performing feature extraction on the binocular image, based on a neural network of an attention mechanism.

7. The depth image generation method of claim 4, wherein the obtaining of the matching cost matrix comprises:
obtaining an initial matching cost matrix, based on the obtained first feature image of each monocular image; and
obtaining the matching cost matrix by performing convolution on the obtained initial matching cost matrix, using a predetermined neural network.

8. The depth image generation method of claim 4, wherein the performing of the cost aggregation comprises performing the cost aggregation on the obtained matching cost matrix, using a graph neural network (GNN).

9. The depth image generation method of claim 4, wherein the performing of the cost aggregation comprises:
obtaining a neighboring node of each central node that is an element of the obtained matching cost matrix, based on a distance; and
obtaining a matching cost matrix of a first generation of cost aggregation by updating a matching cost of each central node, based on a weight of the obtained neighboring node of each central node and a matching cost of the obtained neighboring node of each central node.

10. The depth image generation method of claim 9, wherein the performing of the cost aggregation further comprises performing the cost aggregation on the obtained matching cost matrix, using a second feature image to guide the cost aggregation.

11. The depth image generation method of claim 10, wherein the second feature image is generated based on a semantic segmentation neural network, or is the same as the first feature image.

12. The depth image generation method of claim 10, wherein the performing of the cost aggregation further comprises:
obtaining a neighboring node of each pixel of the second feature image, based on the distance;
obtaining the neighboring node of each central node that is the element of the obtained matching cost matrix, based on a pixel correspondence relationship between the second feature image and a matching cost;
obtaining a matching cost matrix of a second generation of cost aggregation by updating the matching cost of each central node, based on a weight and a matching cost of neighboring nodes; and
obtaining a matching cost matrix of a third generation of cost aggregation by aggregating the obtained matching cost matrix of the first generation of cost aggregation and the obtained matching cost matrix of the second generation of cost aggregation.

13. The depth image generation method of claim 9, wherein the distance is one among a spatial distance, a feature vector distance, and a weighted sum of the spatial distance and the feature vector distance.

14. The depth image generation method of claim 4, wherein the performing of the cost aggregation comprises:
obtaining a temporary matching cost matrix, based on multiple matching cost matrices of different scales;
obtaining a probability that each element of the temporary matching cost matrix corresponds to a predetermined parallax; and
obtaining a matching cost matrix of a fourth generation of cost aggregation, based on the obtained probability and the obtained temporary matching cost matrix.

15. The depth image generation method of claim 4, wherein the performing of the cost aggregation comprises obtaining a matching cost matrix of a fifth generation, based on a similarity matrix and the obtained matching cost matrix, and
wherein the similarity matrix is generated based on the binocular image.

16. The depth image generation method of claim 1, wherein the obtaining of the first depth image comprises:
obtaining a first feature image of each monocular image included in the binocular image by performing feature extraction on the binocular image, using a predetermined neural network;
obtaining a matching cost matrix, based on the obtained first feature image of each monocular image;
calculating a probability that each element of the obtained matching cost matrix corresponds to a predetermined parallax, to convert the obtained matching cost matrix into a matching probability matrix; and
obtaining a depth image of each monocular image, based on the obtained matching probability matrix.

17. A non-transitory computer-readable storage medium storing instructions that, when executed by at least one processor, cause the at least one processor to perform depth image generation comprising:
obtaining a first depth image, based on a binocular image;
obtaining a second depth image, using a depth camera; and
obtaining a final depth image by performing image fusion on the obtained first depth image and the obtained second depth image,
wherein the obtaining the second depth image comprises:
extracting a depth feature from a third depth image that is obtained using the depth camera; and
obtaining the second depth image, on which depth completion is performed, by performing, on the extracted depth feature, filtering that is guided by a similarity matrix, and
wherein the similarity matrix is obtained based on the binocular image.

18. A depth image generation device comprising:
a memory storing instructions; and
at least one processor configured to execute the stored instructions to:
obtain a first depth image, based on a binocular image;
obtain a second depth image, using a depth camera; and
obtain a final depth image by performing image fusion on the obtained first depth image and the obtained second depth image,
wherein the at least one processor is further configured to:
extract a depth feature from a third depth image that is obtained using the depth camera; and
obtain the second depth image, on which depth completion is performed, by performing, on the extracted depth feature, filtering that is guided by a similarity matrix, and
wherein the similarity matrix is obtained based on the binocular image.

19. A depth image generation method comprising:
selecting a monocular image from a binocular image;
obtaining a first depth image based on the binocular image;
obtaining a similarity degree between image pixels of the selected monocular image, using a first neural network, to obtain a similarity matrix;
performing feature extraction on a depth image that is obtained using a depth camera, using a second neural network, to obtain a depth feature;
performing filtering on the obtained depth feature, based on the obtained similarity matrix, to obtain a second depth image; and
obtaining a final depth image by performing image fusion on the obtained first depth image and the obtained second depth image,
wherein the obtaining the second depth image comprises:
extracting a depth feature from a third depth image that is obtained using the depth camera; and
obtaining the second depth image, on which depth completion is performed, by performing, on the extracted depth feature, filtering that is guided by a similarity matrix, and
wherein the similarity matrix is obtained based on the binocular image.

* * * * *